Oct. 17, 1967
S. M. ZANDMER
3,347,317
SAND SCREEN FOR OIL WELLS
Filed April 5, 1965
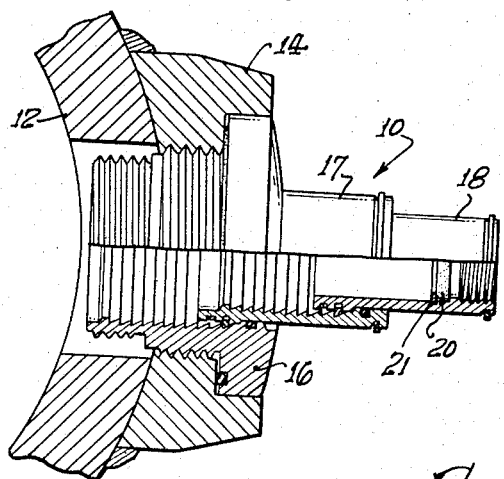
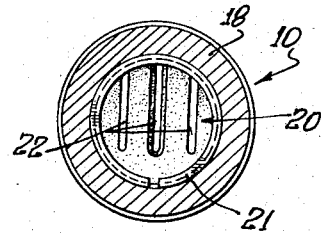
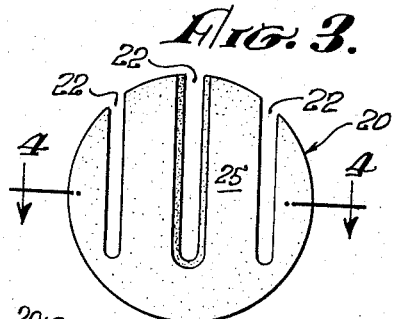
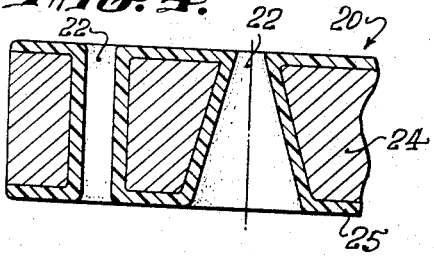
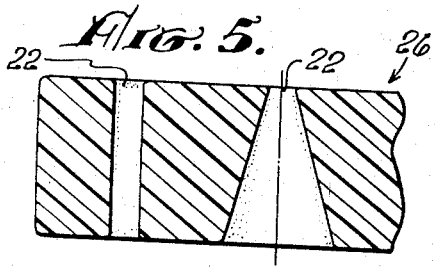
INVENTOR
SOLIS MYRON ZANDMER,
By Knight & Rodgers
ATTORNEYS

United States Patent Office 3,347,317
Patented Oct. 17, 1967

3,347,317
SAND SCREEN FOR OIL WELLS
Solis Myron Zandmer, 111 Glenn Ave., Banff,
Alberta, Canada
Filed Apr. 5, 1965, Ser. No. 445,512
6 Claims. (Cl. 166—100)

ABSTRACT OF THE DISCLOSURE

An extensible duct forming device mounted on casing in an oil well or the like, has a surface in a tubular member against which internal pressure is applied in order to extend the device to the surrounding formation. Immediately inside the end of the tubular member is a sand screen which is inert with respect to acid used to dissolve the wall providing said surface, thereby opening the duct, and is also inert with respect to normal well fluids. The screen is preferably metal coated with a fluorocarbon offering minimum adhesiveness to solid particles retained on this screen.

---

The present invention relates generally to screens or other devices having small orifices for keeping sand out of oil or gas producing wells; and more especially to a non-plugging screen or similar device for use in connection with means forming a fluid duct between the interior of the casing in the well and the oil or gas producing formation surrounding the well, such device being used to hold back sand.

In unconsolidated sand formations, the flow of oil and gas into the casing would carry with it a certain percentage of loose particles of sand if they were not restricted or removed by a properly sized screen. The fluid flow carries these particles to the casing where the screen stops the particles from entering the casing. Of course, some extremely fine particles are usually carried upwardly in the casing but this results from a relatively high velocity of fluid flow. Since a quantity of sand entering and settling in the casing eventually plugs up the well and shuts off production, various types of screens have been developed in order to keep sand out of the casing.

Screens of known types have generally been made from metals which have a tendency to corrode and to plug up the openings in the screen when immersed over long periods of time in the well due to the reaction with various chemicals or compounds encountered in wells. The result of such corrosion is in some cases to gradually close or, in other cases, to enlarge the holes through which the oil and gas pass, thus making it sometimes easier to sand to enter the casing but in either event destroying the effectiveness of the screen since corrosion may gradually result in the screen orifice or openings becoming plugged. Roughening of the metal as a result of corrosion and also the polar effects facilitate adhesion to the metal around the openings in the screen of any solids or semi-solids carried by the oil, such as waxes which may tend to adhere to the metal. These materials tend to bond the sand particles to the surface of the screen, closing the interstices between the particles and eventually forming a solid plug which closes off the screen and prevents passage of the oil and gas into the casing. The presence of sand particles on the outside of the screen is in some ways beneficial since the sand particles by themselves form a bed which is porous, thus forming an additional filter or filter bed which operates to retain even smaller sizes of foreign particles than would be held back by the screen itself.

Thus it becomes of prime importance that the screens, or at least those portions exposed to well fluids, be of such a character that there is no chemical action between well fluids and the screen which makes the screen ineffective or inoperative, either by corroding the screen material in a manner to enlarge the openings through the screen or by building up a plug of sand and binder which eventually operates to plug and close the openings in the screen.

Thus it is a general object of the present invention to provide a screen for use in wells which is not subject to corrosion or deterioration by chemical reaction with compounds encountered in the wells and which accordingly has a comparatively long life.

It is a further object of the invention to provide a screen of novel design which is not only resistant to attack or dissolution in acids or other compounds in the produced fluids in a well which attack metal, but which screen also has a very low adhesion to particles of sand or other solids or semi-solids that may be carried to and through the screen by the normal flow of fluids from the producing formation.

According to the present invention, these objectives are achieved by providing a sand screen for use in an oil or gas producing well comprising a body having its exposed surfaces provided by a material characterized by chemical inertness with respect to well fluids and, preferably, a material which also has a very low tendency to adhere to any of the solid hydrocarbons present in the produced fluids. For this purpose, a metal screen may be coated with a suitable compound selected from various known synthetic resins or the screen may be made of a solid body of such synthetic resins. While various resins are suitable for this use, a particularly advantageous resin is one of the fluorocarbons, and more specifically tetrafluoroethylene, sold under the trade name "Teflon," which has no known solvent.

How the above objects and advantages of the present invention, as well as others not particularly mentioned herein, are attained will be better understood by reference to the following description and to the annexed drawing, in which:

FIG. 1 is a combined side elevation and longitudinal median section of a duct forming means adapted for mounting on oil well casing, provided with a sand screen embodying the present invention.

FIG. 2 is a transverse section through the duct forming means on line 2—2 of FIG. 1.

FIG. 3 is an enlarged elevation of the screen removed from its holder.

FIG. 4 is a further enlarged section through the screen of FIG. 3, showing a screen composed of a metal core coated with a synthetic resin.

FIG. 5 is a view similar to FIG. 4 showing a screen made from a homogeneous body of synthetic resin.

Referring now to the drawing, and more particularly to FIG. 1, there is shown therein as one exemplary device for providing a fluid duct between the inside of a casing and the surrounding oil bearing formation, the device commonly being referred to in the industry as a permeator. The duct forming means, as indicated generally at 10, is mounted on casing 12, a fragment of which is shown in FIG. 1, by means of a boss or mounting pad 14 attached to the exterior surface of the casing in any suitable manner, as by welding.

From FIG. 1, it will be seen that the permeator comprises a body 16 in which is slidably mounted a first telescoping member 17, a second telescoping member 18 being slidably mounted within the first member. The two telescoping members 17 and 18 are concentric with each other and with the body 16 and are of such a length that when the members are in the telescoped or contracted position, the overall axial dimension of the permeator is no greater than the corresponding external dimension of body 16. By the application of pressure inside the casing, the permeator can be extended to the position shown in FIG. 1, the telescoping members being forced outwardly to the position shown. To enable the permeators to be extended in this manner under internal fluid pressure, a metal cap is located at the outer end of the inner telescoping member 18. After extending the permeator, this metal cap is removed in any suitable way, usually being dissolved by acid, in order to open up the permeator for the passage therethrough of oil and gas from the adjacent formation and consequently such cap member is not illustrated in the drawing. The construction and operation of permeators of this character are described more fully in my earlier Patent No. 2,775,304, granted on Dec. 25, 1956, for "Apparatus for Providing Ducts Between the Bore Hole Wall and Casing," to which reference may be made for further details.

The sand screen is provided by the screen member 20 which is located preferably in the smallest telescoping member 18. The interior of the telescoping member is preferably counterbored from the inner end to receive screen disc 20, the disc then being held in place in any suitable manner, as by snap ring 21.

As shown in FIGS. 2 and 3, screen disc 20 is provided with one or more openings of suitable configuration and size to pass oil and gas but to retain on the outside of the screen particles of sand. The axially extending side walls of the elongated openings 22 in the disc may be parallel to each other, or they may be inwardly divergent, or they may be both, as shown in FIG. 4.

In order to render the screen chemically inert or inactive with respect to any chemical compounds which may be present in the fluids in the well, the screen is designed to have all exposed surfaces provided by a substance which is characterized by lack of chemical activity with respect to well fluids and also preferably one which has a low tendency to adhere to any solid hydrocarbons that may be present. One such construction of screen 20 for this purpose is illustrated in FIG. 4 in which the screen comprises a metallic body 24 which is coated with a non-metallic coating 25, preferably a coating of a suitable synthetic resin on all surfaces which are exposed to well fluids. It may be desired to not coat or cover the peripheral surface of the screen where it engages the side walls of the bore in permeator section 18, but the front and back surfaces and the sides of the slots are coated, since they are exposed to well fluids and the corrosive action thereof.

A particularly advantageous plastic or synthetic resin for this purpose is tetrafluoroethylene, commonly sold under the trade name "Teflon," since it has an extremely low tendency to adhere to any other particles, particularly sand grains and also hydrocarbon solids that may be carried to the screen; and at the same time all of the fluorocarbon resins are insoluble in acids and consequently are chemically inert with respect to well fluids. Other synthetic resins may be entirely satisfactory for this purpose, such as polycarbonates, polyphenylene oxide and the various nylons.

Alternatively, the screen disc may be made from a solid or homogeneous body of the synthetic resin, as shown at 26 in FIG. 5. The configuration of the screen is the same as before except that it is not a composite member as in FIG. 4.

It is also within the scope of the present invention to apply the same concept to other types of well screens. For example, the slotted casing type of screen can be made of metal and coated with a suitable synthetic plastic, as shown in FIG. 4. Other types of screens or orifice members which are smaller in overall size than slotted casing and capable of being supported in metal members, can be made from a homogeneous body of synthetic plastic.

Accordingly, it is not intended that the above disclosure limit the invention in its broader aspects to a screen contained in a permeator of the type illustrated.

Accordingly, it will be appreciated that various changes in the precise construction and arrangement of parts constituting the present invention will occur to persons skilled in the art without departing from the spirit and scope thereof. For this reason, it is to be understood that the foregoing description is considered as being illustrative of, rather than limitative upon, the embodiments of the invention as defined by the appended claims.

I claim:

1. Duct forming means mounted on well casing in a bore-hole traversing fluid bearing formation to establish a fluid duct between the earthen formation and the interior of the casing, comprising
   a stationary body on the casing;
   a tubular member movably mounted on the body for outward movement to the formation in response to internal fluid pressure received from the casing interior;
   a fluid impervious metal closure at the outer end of the tubular member, said closure being of a material dissolvable by a selected chemical reagent and presenting a surface transverse to the axis of the tubular member exposed to fluid pressure internally of the tubular member;
   and a sand screen inside the tubular member and closely adjacent the closure, said screen being inert with respect to said chemical reagent.

2. The combination as in claim 1 in which the body of the sand screen has all exposed surfaces provided by a synthetic resin material characterized by inertness with respect to well fluids.

3. The combination as in claim 2 in which the synthetic resin is a fluorocarbon.

4. The combination as in claim 1 in which the sand screen is a composite structure comprising a metal core coated with a synthetic resin.

5. Duct forming means as in claim 1 in which the sand screen is a disc provided with narrow elongated slots with substantially the full unobstructed inside diameter of the tube available at opposite sides of the disc for fluid flow when the closure is removed.

6. The combination as in claim 5 in which the body of the sand screen has all exposed surfaces provided by a non-metallic material characterized by chemical inertness relative to well fluids and low adhesion to particulate matter retained on the screen.

References Cited

UNITED STATES PATENTS

| | | | |
|---|---|---|---|
| 77,000 | 4/1868 | Colby | 166—229 |
| 77,941 | 5/1868 | White | 166—229 X |
| 874,418 | 12/1907 | McEvoy | 166—229 |
| 1,699,798 | 1/1929 | McEvoy et al. | |
| 2,303,727 | 12/1942 | Douglas | 166—100 X |
| 2,708,000 | 5/1955 | Zandmer | 166—100 |
| 2,933,137 | 4/1960 | D'Audiffret et al. | 166—227 X |

FOREIGN PATENTS

| | | |
|---|---|---|
| 640,310 | 7/1950 | Great Britain. |
| 124,896 | 3/1959 | U.S.S.R. |

OTHER REFERENCES

The Condensed Chemical Dictionary, New York, Reinhold Pub. Corp., 6th ed., 1964, pp. 919, 1110. (Copy in Group 354.)

CHARLES E. O'CONNELL, *Primary Examiner.*

I. A. CALVERT, *Assistant Examiner.*